United States Patent [19]

Spletter

[11] Patent Number: 5,312,165

[45] Date of Patent: May 17, 1994

[54] COMBINATION BRAKE AND WHEEL SYSTEM FOR IN-LINE ROLLER SKATES AND THE LIKE

[75] Inventor: Gary J. Spletter, Winthrop, Mass.

[73] Assignee: FPD Technology, Inc., Sudbury, Mass.

[21] Appl. No.: 976,384

[22] Filed: Nov. 13, 1992

[51] Int. Cl.$^5$ ............................................. B60B 19/00
[52] U.S. Cl. .................................. 301/5.23; 280/11.2; 280/11.22; 188/5
[58] Field of Search ........................ 301/5.3, 5.7, 5.23, 301/5.1; 280/11.19, 11.22, 11.23, 11.25, 11.2; 188/43, 5, 80, 83

[56] References Cited

U.S. PATENT DOCUMENTS

| | | | |
|---|---|---|---|
| 2,893,500 | 7/1959 | De Baun et al. | 188/43 X |
| 3,253,632 | 5/1966 | Dalrymple | 301/5.23 X |
| 3,604,756 | 9/1971 | Gruber | 301/63 R |
| 3,789,947 | 2/1974 | Blumrich | 301/5.23 X |
| 3,895,844 | 7/1975 | Merbler | 301/5.7 |
| 4,070,065 | 1/1978 | Heitfield | 301/5.3 |
| 4,095,846 | 6/1978 | Agins | 301/37 R |
| 4,114,952 | 9/1978 | Kimmell | 301/5.7 |
| 4,208,073 | 6/1980 | Hechinger | 301/5.3 |
| 4,218,098 | 8/1980 | Burton | 301/5.7 |
| 4,219,240 | 8/1980 | Brandenstein | 301/5.7 |
| 4,335,899 | 6/1982 | Hiscock | 301/5.23 X |
| 4,447,093 | 5/1984 | Cunard | 301/63 PW |
| 4,699,432 | 10/1987 | Klamer | 301/5.3 |
| 4,715,460 | 12/1987 | Smith | 301/5.23 X |
| 4,909,523 | 3/1990 | Olson | 280/11.2 |
| 5,028,058 | 7/1991 | Olson | 280/11.2 |
| 5,048,848 | 9/1991 | Olson | 280/11.22 |
| 5,067,736 | 11/1991 | Olson | 280/11.2 |
| 5,068,956 | 12/1991 | Malewicz | 29/437 |
| 5,246,238 | 9/1993 | Brown | 301/5.3 X |

FOREIGN PATENT DOCUMENTS

3702660  8/1988  Fed. Rep. of Germany ..... 301/5.23

Primary Examiner—Russell D. Stormer

[57] ABSTRACT

A brake and wheel for in-line roller skates having multiple slip disks (30a to 30ad) which are placed on retainer ring (40). Slip disks (30a to 30ad) being made of flexible plastic material, and retainer ring (40) being made of low friction plastic material. Retainer ring (40) being snapped closed once slip disks (30a to 30ad) are in place. A right rim (20) and a left rim (50) are placed abutting each other. The rims are joined in the circular hollow of assembled retainer ring (40) and slip disks (30a to 30ad) by screws (10a to 10c).

20 Claims, 11 Drawing Sheets

COMBINATION BRAKE AND WHEEL SYSTEM FOR IN-LINE ROLLER SKATES AND THE LIKE

BACKGROUND OF THE INVENTION

1. Field Of The Invention

This invention relates generally to the field of in-line roller skates, and more particularly provides an improved in-line skate wheel which can also be used for braking.

2. Description Of The Prior Art

In-line roller skates use two or more wheels arranged in a single vertical plane. The primary components of an in-line skate are the boot, the frame to hold the wheels, the wheels, and the brake. The in-line skate is designed to replicate the technique of ice skating. A significant number of consumers use in-line skates as an off-season training device. Their popularity has increased to the point that a number of in-line hockey leagues have been started.

In-line roller skates commonly use a cylindrical brake pad attached to the rear of one of the in-line skates. The pad is typically made of rubber. The skater tilts the brake foot up to stop, pivoting the skate about the most rearward wheel. He then exerts pressure on the brake with his heel while bending the opposite knee and leaning forward at the waist. Such a system is shown in U.S. Pat. No. 4,909,523 to Olson (1990)

This method of braking requires a long distance to stop. The lengthy stopping distance may lead to accidents. Even though popularity of in-line skates has been increasing, a significant portion of consumers are reluctant to purchase in-line skates as a result of the braking problem. Beginners are especially prone to accidents which result from the inability to quickly stop.

Another method of braking is called the T-Stop. While maintaining balance on one skate, the skater extends the other skate out and slightly behind. The braking skate is oriented perpendicular to the front skate. The skater then drags the inside edge of the wheels by pressing down with her rear leg.

The T-Stop is a more advanced method of stopping, requiring a greater skill level. As such, it is difficult for a beginner to learn. If done improperly it can cause an unwanted change in direction. In addition, the stopping distance is still not as desirable as consumers would prefer.

As a result, inventors created improvements to the cylindrical brake. U.S. Pat. No. 5,028,058 to Olson (1991) shows a cylindrical brake assembly with lateral arms that reinforce and stabilize the side rails of the frame. U.S. Pat. No. 5,067,736 to Olson (1991) shows a brake pad which is retained to the brake housing by an interacting tongue and slot system. The system causes the pad to be tightly forced into the housing during braking.

Both the above improvements are variations on the previously mentioned cylindrical brake pad. The stopping distance is still longer than desired by consumers. In addition, none of the above brakes simulates the stopping motion of an ice skate. Since an in-line skate is designed to replicate ice-skating movement, this is an undesirable feature.

Roller skates are similar to in-line skates. They share many of the same braking issues. U.S. Pat. No. 3,968,973 to McCormack (1976) depicts a toe mounted brake for roller skates. This brake produces a prolonged stop.

U.S. Pat. No. 4,108,451 to Scheck (1978) shows a brake for roller skates which is activated by a hand operated brake grip. This brake is difficult to manufacture, requires the use of the skater's hand, and significantly alters the appearance of the skate. In addition, it protrudes from the outline of the body of the skate. This protrusion may lead to objects being snagged on the brake U.S. Pat. No. 4,275,895 to Edwards (1981) introduces a roller skate brake which is activated by a rear mounted lever which contacts the skaters calf. The skater activates the brake by leaning backward. The brake is difficult and complicated to manufacture. It is also difficult and cumbersome for the skater to engage the brake with the calf as it is not a natural movement.

U.S. Pat. No. 4,300,781 to Riggs (1981) shows a brake for roller skates which is controlled by a hand activated device attached to the skater's outer thigh. This brake is difficult to manufacture. In addition, it requires the use of the skaters hands which is awkward. The brake also significantly changes the physical appearance of the skate.

U.S. Pat. No. 4,453,726 to Ziegler (1984) shows a rear mounted braking wheel. The skater must pivot the skate rearward about the rear wheels to activate the brake. This method is complicated to manufacture and produces a lengthy stop.

In addition, none of the above brakes can be easily added to an existing pair of skates, thus reducing the potential number of customers.

SUMMARY OF THE INVENTION

The invention provides a number of advantages including:

(a) the provision of a brake for in-line skates which quickly stops the skater;

(b) the provision of a braking system for in-line skates which will reduce the number of accidents;

(c) the provision of a braking system for in-line skates which can be easily learned by the beginner;

(d) the provision of a braking system for in-line skates which will be resistant to unwanted directional changes during the braking action;

(e) the provision of a brake for in-line skates which replicates the braking action of ice skates;

(f) the provision of a brake for in-line skates which is simple to manufacture.

(g) the provision of a brake for in line skates which does not protrude from the existing physical shape of the skate;

(h) the provision of a brake for in-line skates which leaves the user's hands free;

(i) the provision of a braking system for in-line skates which does not significantly alter the existing physical appearance of the skate;

(j) the provision of a brake for in-line skates which is easily activated;

(k) the provision of a brake for in-line skates which can be easily added to an existing pair of skates by the consumer.

Further objects and advantages of the invention will become apparent from a consideration of the drawings and ensuing description.

In brief summary, the invention provides a wheel assembly for use in connection with an in-line skate or the like. The wheel assembly includes a substantially cylindrically shaped rim element and a transverse rolling element. The rim element has an outer periphery defining a groove having an interior surface forming a circular segment of more than 180 degrees along the circumference of the short radius thereof, and includes an attachment arrangement for mounting on an in-line skate or the like. The transverse rolling element is placed and retained within the groove of the rim and facilitates rolling of said wheel assembly at a substantially right angle to the direction of rotation of the rim.

BRIEF DESCRIPTION OF THE DRAWINGS

This invention is pointed out with particularity in the appended claims. The above and further advantages of this invention may be better understood by referring to the following description taken in conjunction with the accompanying drawings, in which:

In the drawings, closely related parts have the same number but different alphabetic suffixes.

DETAILED DESCRIPTION OF AN ILLUSTRATIVE EMBODIMENT

Figure 8:
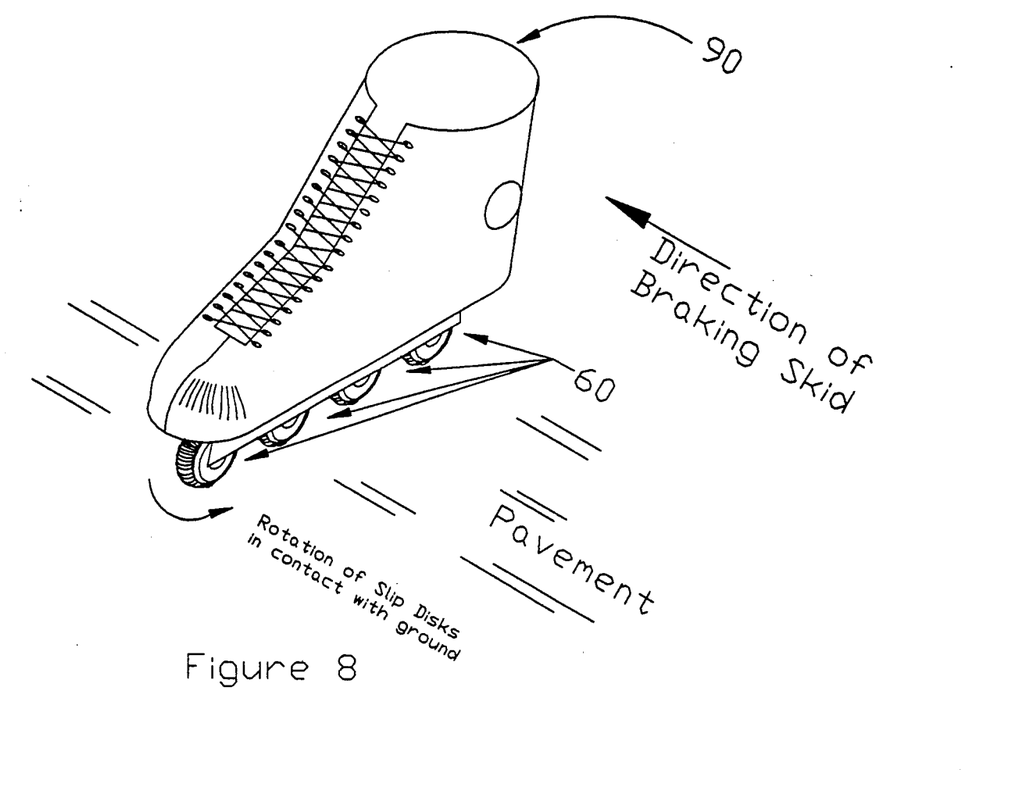
FIG. 8 depicts an in-line skate including wheel assemblies constructed in accordance with the invention.

FIG. 8 depicts an in-line skate 90 including wheel assemblies constructed in accordance with the invention. With reference to FIG. 8, skate 90 includes a boot 91, into which a skater would insert his or her foot. At the sole of the boot is mounted a frame 92, to which a selected number of wheel assemblies, generally identified by reference numeral 60, are mounted. The skate 90 depicted in FIG. 8 is shown having four wheel assemblies 60, but it will be appreciated that a skate 90 in accordance with the invention may have any number of wheel assemblies 60.

Figure 1:
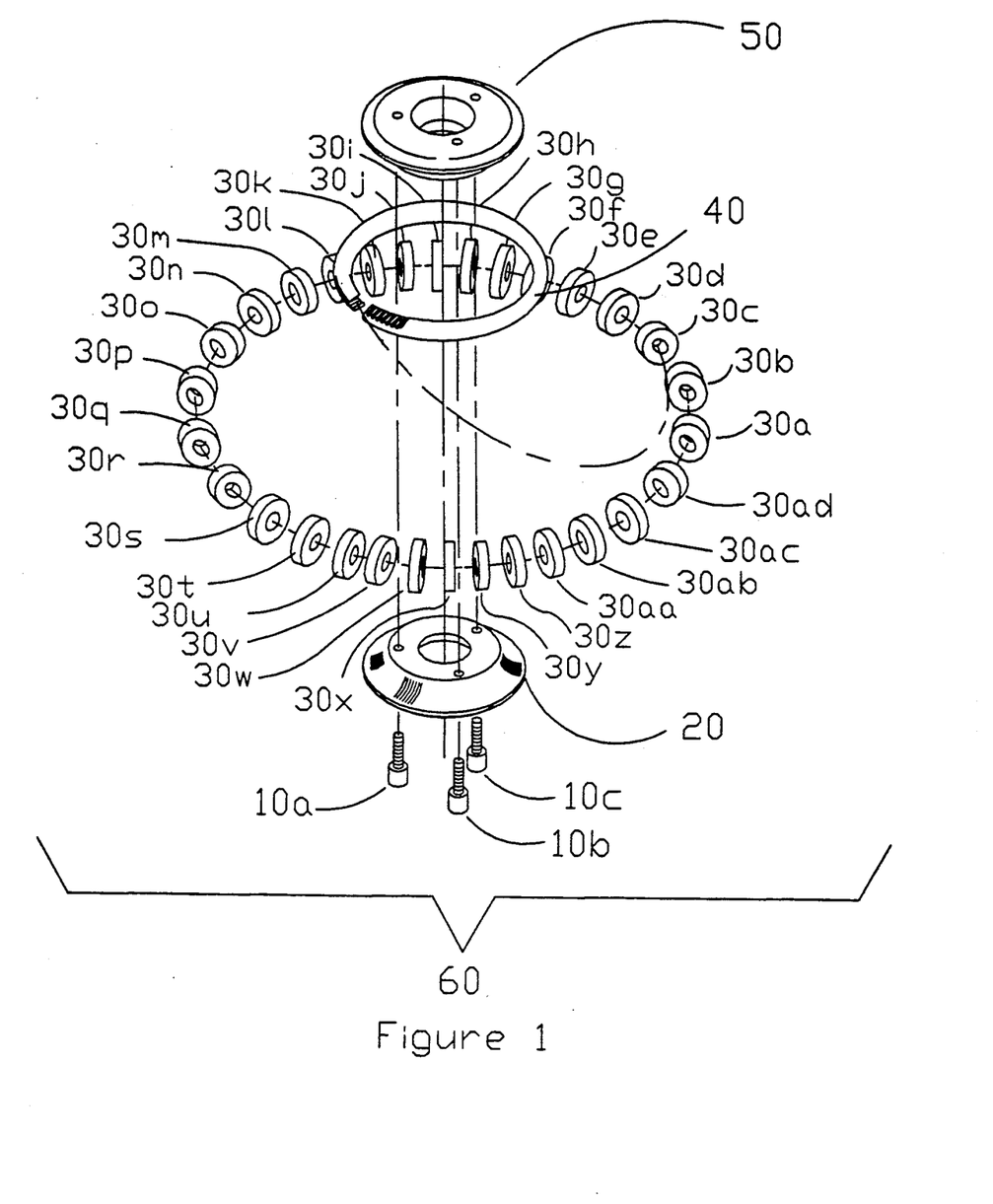
FIG. 1 depicts an exploded view of a wheel assembly constructed in accordance with the present invention.
Figure 2:
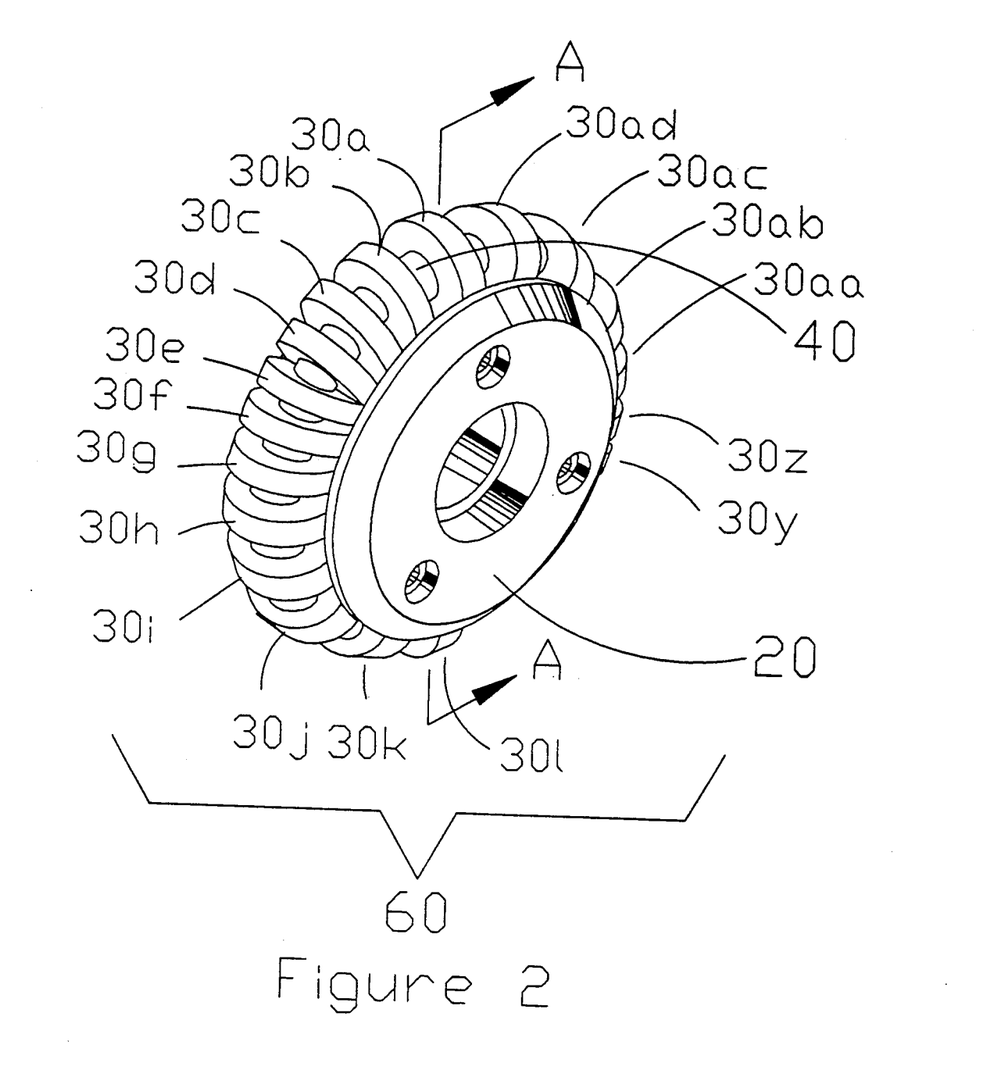
FIG. 2 depicts an assembled view of a wheel system constructed in accordance with the present invention.

Before proceeding further, it would be helpful to present a detailed description of one embodiment of the wheel assemblies 60. FIGS. 1 and 2 together comprise a detailed depiction of one embodiment of a wheel assembly 60. With reference to those Figs., a brake wheel assembly 60 has a plurality of annular-shaped slip disks 30a to 30ad, which are mounted on a retainer ring 40. The slip disks 30a to 30ad each include a central hole, through which is inserted a toroidally-shaped retainer ring 40. When the ends 41 and 42 of the retainer ring 40 are joined together as described below, the slip disks generally form a toroid, which is mounted on a rim assembly formed by a left rim 50 and a right rim 20. The left rim 50 and right rim 20 are joined by fasteners such as three screws 10a, 10b, and 10c, to form an outer groove 21 onto which the slip disk/retainer ring assembly is mounted. The left rim 50 and right rim 20 form a central aperture 25 through which an axle and bearings are inserted to facilitate mounting of the wheel assembly to the frame 92 (FIG. 8).

Slip disks 30a to 30ad may be made of a flexible plastic material such as polyurethane. As noted above, each slip disk 30a to 30ad is annular in shape, with the center aperture being large enough to allow retainer ring 40 to pass through it. The thickness of the annulus can be varied to provide certain ride and braking characteristics.

Retainer ring 40 is preferably manufactured from a plastic with a low coefficient of friction such as oil impregnated nylon or PTFE. Retainer ring 40 is closed once slip disks 30a to 30ad have been strung onto it, and when closed the retainer ring 40 is shaped like a toroid. The ends of retainer ring 40 are formed to lock in place in a secure manner once they have been joined during assembly. In the preferred embodiment the ends of retainer ring 40 form an inter-locking saw tooth shape which remains joined during normal operation of the device. Retainer ring 40 may also be shaped like a polygon instead of a toroid, with the number of sides of the polygon being equal to the number of slip disks; in that case, each slip disk may conveniently ride on a portion of the retainer ring forming one side of the polygon. In addition, the cross-section of the retainer ring 40 may be of a shape other than circular; for example, it may be less costly to manufacture retainer ring 40 with a star-shaped cross section.

Left rim 50 and right rim 20 may also be made of a plastic material which has a low coefficient of friction such as oil impregnated nylon or PTFE. Left rim 50 and right rim 20 may be cylindrical in shape and, when jointed, form groove 21 on their outer rim of such a dimension that slip disks 30a to 30ad, when mounted on the retainer ring 40, fit snugly into the groove 21 between left rim 50 and right rim 20 when the two rims abut each other. Screws 10a to 10c are standard screws. In the preferred embodiment they are nylon socket screws for reduced weight.

Brake wheel assembly 60 is mounted on in-line skate 90 and frame 92 in exactly the same manner as present in-line skate wheels, thus facilitating an easy retro-fit onto existing in-line skates.

The operation of the skate 90 will be described in connection with FIGS. 8 and 9. The usage during normal (non-braking) in-line skating is the same as with a conventional in-line skating, with the skates riding on the outward-most portions of the peripheries of the slip disks 30a through 30ad.

During braking, the skater operates the skate 90 in a manner similar to that used in connection with ice skates. Namely, the skater momentarily pushes the body up which releases the wheel assemblies 60 from contact with the ground by a slight amount. The skater then twists his or her body approximately 90 degrees in either the left or the right direction. This motion orients both skates so the long dimension of the skate 90 is oriented approximately orthogonal to the direction of travel. The skates 90 are then returned to contact with the pavement, at which point the wheel assemblies 60 begin braking action.

FIG. 8 depicts four wheel assemblies 60 in action. The motion of the braking skid is at a right angle to the long dimension of a skate and frame 90. A small number of the slip disks 30a to 30ad will be in contact with the pavement. These slip disks will generally rotate about retainer ring 40.

Figure 9:
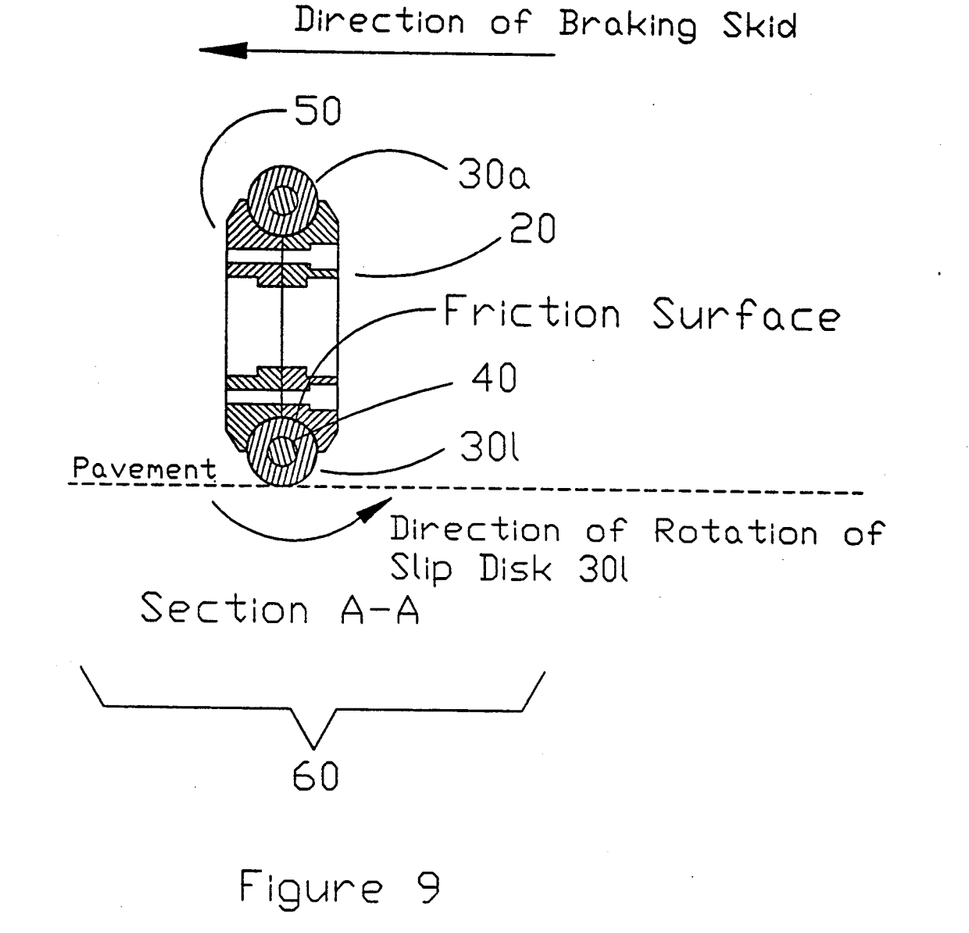
FIG. 9 depicts a section view of the wheel system depicted in FIG. 2, cut along plane A—A as shown in FIG. 2.

FIG. 9 shows a section view of the wheel assembly 60 (refer to FIG. 2 for cutting plane A—A). For the purpose of discussion slip disk 301 is shown as being in contact with the ground. Slip disk 301 generally rotates in a counter-clockwise direction when the direction of the braking skid is from right to left. While it is believed the braking action of the wheel assembly 60 results from the friction which exists between the slip disk which is in contact with the pavement and the abutting grooved surfaces of left rim 50 and right rim 20, this patent application should not be bound by this. The grooved surface is notated as the friction surface in FIG. 9. The coefficient of friction between the two surfaces is by definition greater than 0 but less than 1. As a result of the non-zero value of the coefficient of friction, and the weight of the skater and tension on retainer ring 40, there will be a torque exerted on slip disk 301 which will act to decelerate the skater. The torque will be a function of the coefficient of friction between the slip disk material and the rim material, the weight of the skater, and the tension on retainer ring 40.

The torque on slip disk 301 is transmitted to the skate body and frame 90 (see FIG. 8), and is perceived by the skater as a braking force acting on the skate body and frame 90. As a result of this force the skater slows, and a rotational moment exists which tends to rotate the skater. The skater must change his body weight to retain his balance. The skater's center of gravity must be moved in a direction opposite to the direction of the braking skid. This center of gravity movement is most easily accomplished by the skater leaning away from the direction of the stop.

The braking characteristics can be altered by changing the coefficient of friction between the slip disks 30a to 30ad, and the left rim 50 and right rim 20. This can be accomplished by changing the materials or changing the surface finish of one or more of the contacting components. The braking characteristic can also be modified by changing the tightness with which the retainer ring 40 holds the slip disks against the groove 21 formed by the left and right rims 20 and 50.

It will be appreciated that, during braking, more than one slip disk may be in contact with the ground and providing braking force for the skater. The previous discussion applies equally well to this situation. The retarding torque is not significantly altered in this case.

Figure 3:
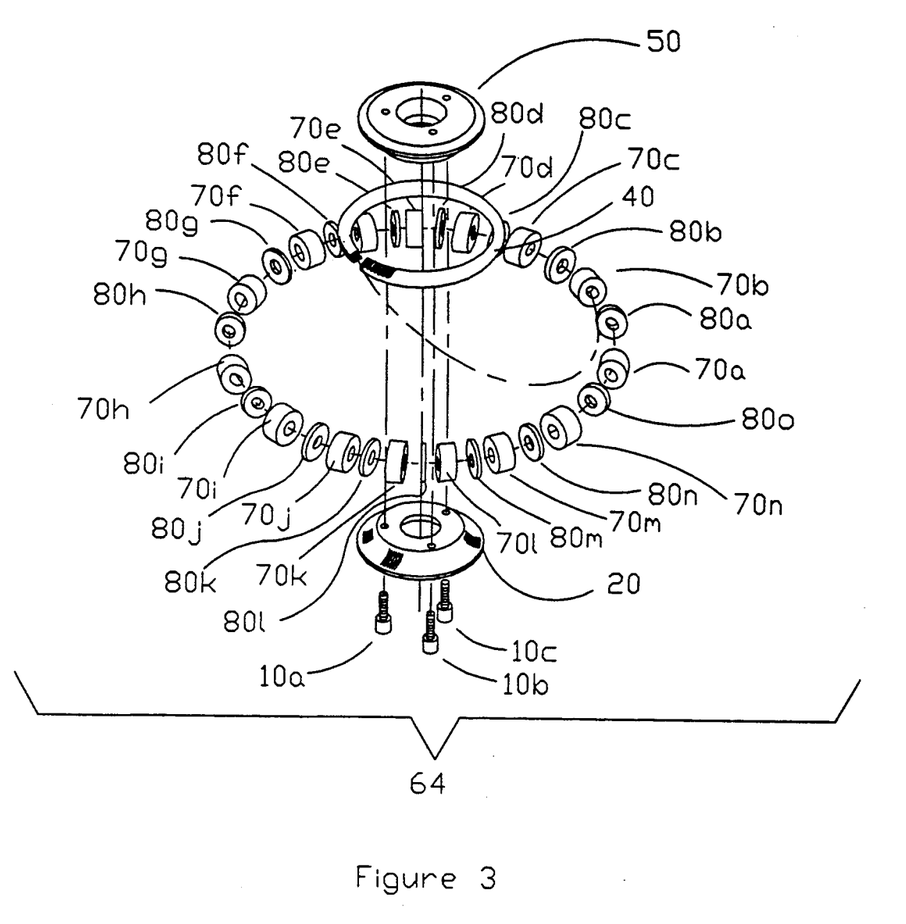
FIG. 3 depicts an exploded view of a first alternate embodiment of the wheel assembly.

Additional embodiments and variations on various portions of the wheel assembly 60 are depicted in FIGS. 3 to 6. FIG. 3 shows a wheel assembly 64 with anti-friction washers and relatively thick slip disks 70a through 70n, (generally identified by reference numeral 70). (That is, the slip disks 70 shown in FIG. 3 are much thicker than slip disks 30a through 30ad shown in FIGS. 1 and 2). An anti-friction washer 80a to 80o has been inserted between each pair of slip disks 70 on an interleaved basis. Anti-friction washers 80a to 80o are preferably made of a plastic material which has a low coefficient of friction such as PTFE or oil impregnated nylon. Each anti-friction washer 80a to 80o is annular in shape, with a center aperture large enough to allow retainer ring 40 to pass through it.

Thick slip disks 70a to 70n resemble slip disks 30a to 30ad (not shown in FIG. 3) in every manner, except they are thicker. The thickness of the thick slip disks 70a to 70o can be varied, but it will be appreciated that in the extreme case one slip disk could encircle the entire circumference of right rim 20 and left rim 50. In this ramification the slip disk could also be manufactured as a closed toroid with or without a retainer ring 40.

Figure 4:
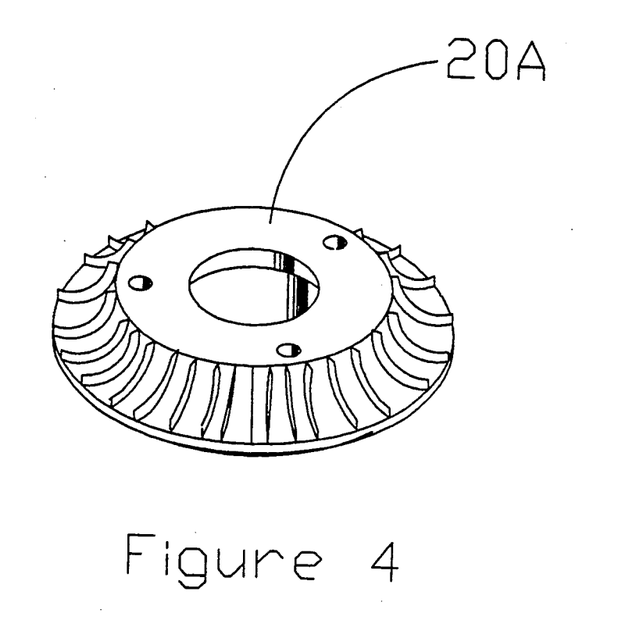
FIG. 4 depicts an alternate embodiment of a rim useful in the wheel assemblies as depicted in FIGS. 1 through 3.

It will also be appreciated that the rims 20 and 50 may have ribs projecting from their surfaces which form the outer groove 21 to hold and limit circumferential motion of the slip disks 30a through 30ad. FIG. 4 shows an embodiment of the right rim 20A with ribs 21A. Each rib 21A may be formed as an integral part of the right rim 20A, in which case the ribs will be formed of the same low friction material as the main body of the rim. In this embodiment, anti-friction washers 80a to 80o (FIG. 3) would be omitted. In an embodiment in which right rim 20A has such ribs 21A, the left rim 50 (not shown in FIG. 4) will also preferably have similar ribs.

Figure 5A:
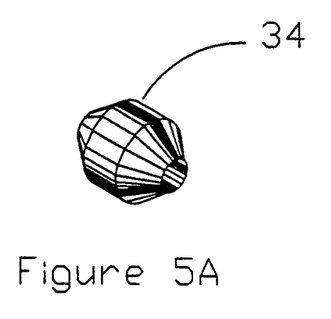
FIGS. 5A, 5B and 5C each depict an alternate embodiment of a slip disk useful in the wheel assemblies as depicted in FIGS. 1 through 3.
Figure 5B:
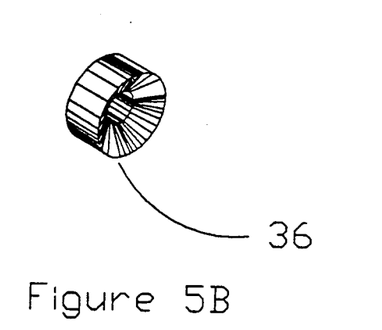
Figure 5C:
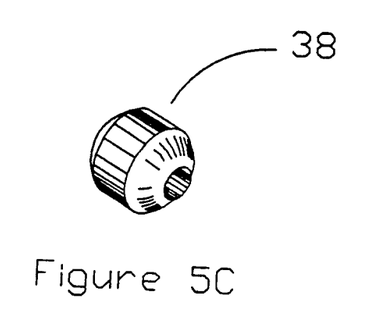

FIGS. 5A, 5B and 5C depicts three alternative embodiments to the preferred embodiment of slip disks 30a to 30ad. In the preferred embodiment, the slip disks 30a through 30ad (as well as the thick slip disks 70) are right cylindrically-shaped members, with planar end caps. In the embodiments of FIGS. 5A through 5C, the end caps are not planer. As shown in FIG. 5A, an obtuse slip disk 34 has end caps which form an obtuse angle with the cylindrical surface of the disk. As shown in FIG. 5B, an acute slip disk 36 has sides which form an acute angle with the cylindrical surface of the disk. As shown in FIG. 5C, a rounded slip disk 38 has end caps which are bowed in shape, projecting outwardly from the cylindrical main portion; it will be appreciated that an embodiment may also include a bowed inwardly-projecting end cap. In each embodiment the planar end caps of slip disks 30a to 30ad have been replaced with non-planar surfaces at a non-right angle to the cylindrical body of the respective disk.

Figure 6:
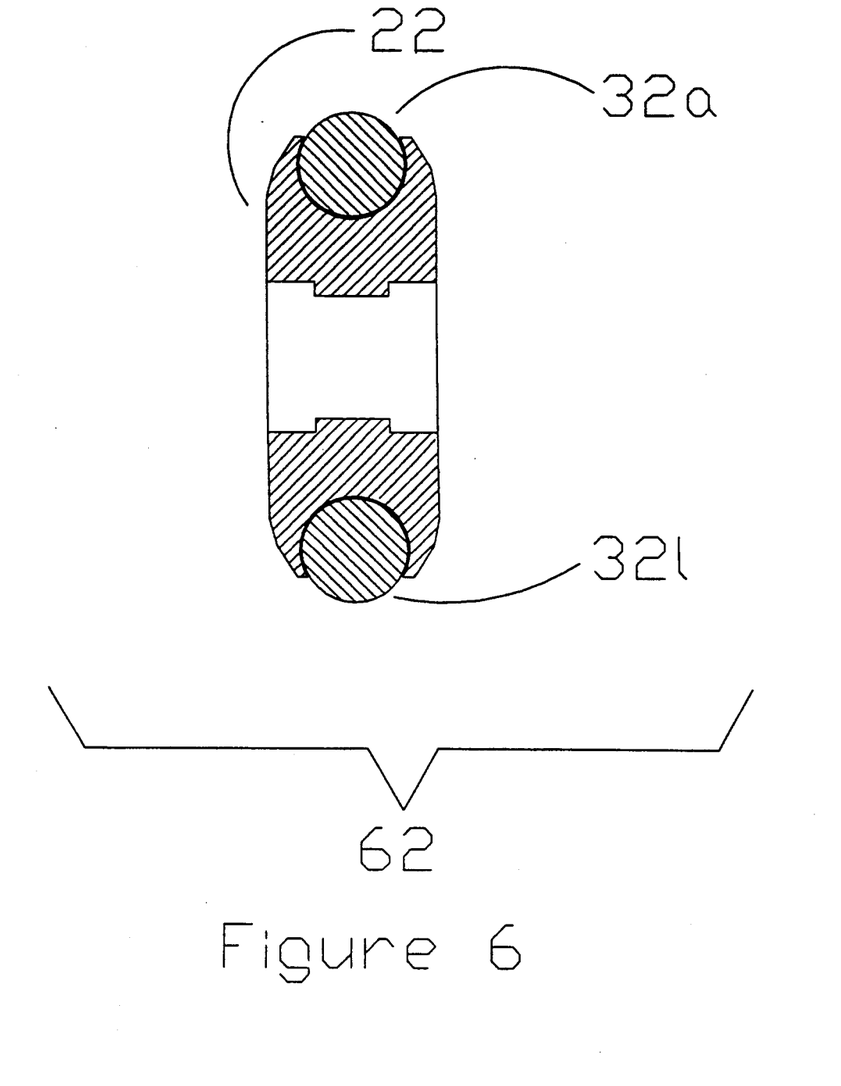
FIG. 6 depicts an further alternative embodiment of the wheel assembly, including a one piece rim.

FIG. 6 shows a section view, taken along plane A—A shown in FIG. 2, of an alternative embodiment, namely a wheel assembly 60 having a one-piece rim 62. One piece rim 22 is used instead of the right rim 20 and left rim 50 in the embodiment depicted in FIGS. 1 and 2, which can eliminate the need for retainer ring 40 in the embodiment depicted in FIGS. 1 and 2. A slip disk 32a and a slip disk 32l are also shown. Elimination of retainer ring 40 allows for alternative forms of slip disks to be used. The alternative slip disks 32a and 32l are similar to slip disks 30a and 30l (not shown) except that the disks are solid (that is, not annular shaped).

Figure 7:
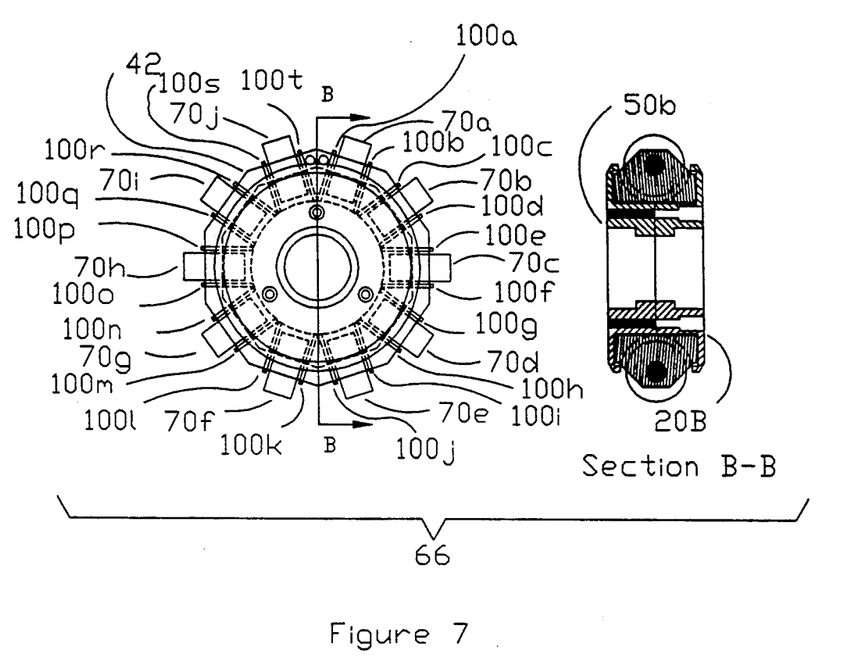
FIG. 7 depicts an further alternative embodiment of the wheel assembly in which stopping friction occurs on the inside diameter of the slip disk.

FIG. 7 portrays a section view of an alternative embodiment of the wheel assembly 60 described above in connection with FIGS. 1 through 6. The primary difference is that friction occurs between the inside aperture of the slip disk and the retainer ring, instead of between the outside edge of the slip disk and the left and right rims. This is achieved through the addition of support plates 100a to 100t which hold the retainer ring up and away from the body of the left and right rims 20B and 50B. In addition, the retainer ring is shaped like a polygon having a number of sides corresponding to the number of slip disks (a decagon in the case of the embodiment depicted in FIG. 7).

An additional embodiment to the present invention would incorporate male and female snap-in devices into right rim 20 and left rim 50. The snap-in devices would replace screws 10a to 10c, holding the two rims together during normal operation.

An additional embodiment of the present invention may change the closure mechanism of retainer ring 40. There are many kinds of snapping and fastening mechanisms known in the prior art. It is possible to combine many of them with retainer ring 40. For example a socket bead cap screw with mating threads could be used. There are also a number of alternative snap designs which could be employed to join the ends of retainer ring 40.

From the description above, a number of advantages of the wheel assembly 60 become evident:

(a) The skater can quickly stop with the aid of the wheel assembly 60.

(b) The number of accidents will be reduced since the skater will have greater control of his or her speed and direction.

(c) The novice skater can quickly learn the use of the wheel assembly 60 since it closely resembles the stopping action of ice skates.

(d) The braking motion will be resistant to unwanted changes of direction during the braking skid.

(e) The braking action will replicate the braking action of ice skates.

(f) The wheel assembly 60 will be simple to manufacture.

(g) The wheel assembly 60 does not protrude from the existing physical shape of the in-line skate.

(h) The skater's hands are left free during braking, providing better balance and control during normal operation and during braking.

(i) The physical appearance of the in-line skate is not significantly altered by the addition of the wheel assembly 60.

(j) The wheel assembly 60 is easily activated by the skater.

(k) The wheel assembly 60 may be easily added to an existing pair of in-line skates.

It is thus apparent that the various embodiments of wheel assembly provide a safe and quick arrangement for stopping in-line skaters. In addition, it can be easily learned by the novice, provides a straight braking path, replicates the braking action of ice skates, is simple to manufacture, does not protrude from the main body of the skate, leaves the skater's hands free, does not significantly alter the physical appearance of the skate, is easily activated, and can be readily added to an existing pair of in-line skates.

While the description above contains many specific embodiments, these should not be construed as limitations on the scope of the invention, but rather as illustrations of the various preferred embodiments thereof. Many other variations are possible. For example, the shape of right rim 20 and left rim 50 can be modified to provide similar structural support with less weight, the material of right rim 20, retainer ring 40, and left rim 50 can be changed to provide different friction coefficients, and the material of slip disks 30a to 30ad can be modified to provide different ride properties.

The foregoing description has been limited to specific embodiments of this invention. It will be apparent, however, that variations and modifications may be made to the invention, with the attainment of some or all of the advantages of the invention. Accordingly, the scope of the invention should be determined not by the embodiments illustrated, but by the appended claims and their legal equivalents.

What is claimed as new and desired to be secured by Letters Patent of the United States is:

1. A wheel assembly for use on an in-line skate, the wheel assembly comprising:

(a) a radially arranged support structure defining an outer periphery defining a groove, and an attachment means for mounting said radially arranged support structure on the frame of an in-line skate or the like, (b) transverse rolling means mounted in said groove for enabling rolling of said wheel assembly at a right angle to the direction of rotation of said radially arranged support structure, said rolling means being placed and retained within the groove of said support structure and contacting the interior surface of said groove so that, when a skater directs the skate in an orientation transverse to the skater's direction of travel, the transverse rolling means and the interior surface of said groove cooperate to brake the skater.

2. The wheel assembly of claim 1 wherein said attachment means comprises a hole of predetermined size and shape for accepting bearing and axle means.

3. The wheel assembly of claim 1 wherein said transverse rolling means comprises one or more rotating elements each having a circular cross section, said rotating elements being of predetermined size to fit within said groove of said support structure.

4. The wheel assembly of claim 1 further including anti-friction means for reducing the friction between adjacent said transverse rotational means.

5. The wheel assembly of claim 4 wherein said anti-friction means comprises one or more planar shaped elements of predetermined size being made of a low friction material.

6. A wheel assembly for use on an in-line skate, said wheel assembly comprising:

A. a radially arranged support structure having a groove defined along the periphery thereof, and an attachment means for mounting said support structure on the frame of the in-line skate, B. transverse rolling means mounted along the groove to enable rolling of said wheel assembly in a direction transverse to the primary direction of motion of the skater, C. retaining means for holding said transverse rolling means in said groove.

7. The wheel assembly of claim 6 wherein said attachment means comprises a hole of predetermined size and shape for accepting bearing and axle means.

8. The wheel assembly of claim 6 wherein said transverse rolling means comprise one or more rotating elements each having a circular cross section, said rotating elements having a predetermined size to facilitate mounting in said groove of said support structure.

9. The wheel assembly of claim 6 wherein:

A. said transverse rolling means have an aperture to accommodate said retaining means, and B. said retaining means comprises, an element having a cross section which traverses an open surface of revolution, and closure means located at each end thereof, and C. said retaining means being generated by rotating said cross section about a nonintersecting coplanar line as axis, said rotation transversing through less than 360 degrees of rotation about said coplanar line, thus forming an open geometric surface, said retaining means also having a closure means located on each end of the long axis thereof for connecting each end of said long axis thereof, forming a closed geometric surface when connected.

10. The wheel assembly of claim 9 wherein said closure means comprises a pair of complementary shaped fastening devices formed at each end of said long axis, said fastening devices when joined together having an exterior surface which conforms to the exterior surface of said cross section of said retaining means.

11. The wheel assembly of claim 6 further including anti-friction means for reducing the friction between adjacent said transverse rotational means.

12. The wheel assembly of claim 11 wherein said anti-friction means comprises one or more substantially planar shaped elements of predetermined size being made of a low friction material.

13. The wheel assembly of claim 6 wherein said radially arranged support structure comprises two similar but mating radially arranged support structures each having, a groove along the circumference thereof, an attachment means for mounting the mating elements on an in-line skate or the like, and joining means for combining the mating elements.

14. A wheel assembly for use on an in-line skate, the wheel assembly comprising:
  A. one or more rolling elements for enabling rolling in a direction transverse to the primary direction of travel of a skater, said rolling elements having at least one circular cross section, are arranged with their axes of rotation forming the chord of a circle.
  B. transverse rotatable support means for enabling rolling in the same direction of travel as the skater, said transverse rotatable support means having, (i) an attachment means for mounting on an in-line skate or the like, and (ii) a retaining means for holding said rolling elements in close proximity with a proximate surface of said transverse rotatable support means, so that, when a skater directs the skate in an orientation transverse to the skater's direction of travel, the transverse rolling means and said proximate surface cooperate to brake the skater.

15. The wheel assembly of claim 14 wherein said transverse rotatable support means comprises a radially arranged support structure having a groove defined around its periphery, and an attachment means for mounting said transverse rotatable support means on the frame of an in-line skate or the like.

16. The wheel assembly of claim 15 wherein said attachment means comprises a hole of predetermined size and shape to accept bearing and axle means.

17. The wheel assembly of claim 14 wherein:
  A. said retaining means comprises, an element having a cross section which traverses an open surface of revolution, and closure means located at each end thereof,
  B. said retaining means being generated by rotating said cross section about a nonintersecting coplanar line defining an axis, the rotation trasversing less than 360 degrees of rotation about said axis thereby forming an open geometric surface, said retaining means also having closure means located at each end of the long axis thereof for connecting each end of said long axis thereof, forming a closed geometric surface when connected.

18. The wheel assembly of claim 17 wherein said closure means comprises a pair of complementary-shaped fastening devices formed at each end of said long axis, said shapes when joined together having an exterior surface which conforms to the exterior surface of said cross section of said retaining means.

19. The wheel assembly of claim 14 further including anti-friction means for reducing the friction between adjacent said transverse rotational means.

20. The wheel assembly of claim 19 wherein said anti-friction means comprises one or more planar shaped elements of predetermined size being made of a low friction material.

* * * * *